(12) United States Patent
Oh

(10) Patent No.: US 9,915,920 B2
(45) Date of Patent: Mar. 13, 2018

(54) HOLOGRAPHIC IMAGE GENERATION

(71) Applicant: EMPIRE TECHNOLOGY DEVELOPMENT LLC, Wilmington, DE (US)

(72) Inventor: Hyun Oh Oh, Gwacheon-si (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 10 days.

(21) Appl. No.: 15/117,730

(22) PCT Filed: Feb. 18, 2014

(86) PCT No.: PCT/US2014/016885
§ 371 (c)(1),
(2) Date: Aug. 10, 2016

(87) PCT Pub. No.: WO2015/126362
PCT Pub. Date: Aug. 27, 2015

(65) Prior Publication Data
US 2017/0248915 A1    Aug. 31, 2017

(51) Int. Cl.
*G03H 1/00*    (2006.01)
*G03H 1/08*    (2006.01)
(Continued)

(52) U.S. Cl.
CPC ......... *G03H 1/0005* (2013.01); *G03H 1/0443* (2013.01); *G03H 1/0891* (2013.01);
(Continued)

(58) Field of Classification Search
None
See application file for complete search history.

(56) References Cited

U.S. PATENT DOCUMENTS 7,782,510 B2    8/2010   Wilson et al.
8,218,210 B2    7/2012   Gitter
(Continued)

OTHER PUBLICATIONS

International Search Report and Written Opinion of the International Searching Authority, International application No. PCT/US2014/016885, dated Jun. 3, 2014.
(Continued)

*Primary Examiner* — Creighton Smith
(74) *Attorney, Agent, or Firm* — Turk IP Law, LLC (57) ABSTRACT

Briefly stated, technologies are generally described for providing a computer-generated holography (CGH). Example devices/systems described herein may use one or more of a server device and/or a client device. The server device may be configured to provide CGH data to a client device including a holographic image display unit. The server device may receive information on the holographic image display unit from the client device, calculate the CGH data from three-dimensional image data and the information on the holographic image display unit, and/or transmit the CGH data to the client device. The client device may be configured to provide a holographic image. The client device may reconstruct the holographic image on the holographic image display unit using CGH data and a reconstruction beam, transmit information on the holographic image display unit to the server device, and/or receive the CGH data from the server device.

40 Claims, 8 Drawing Sheets

(51) Int. Cl.
*G03H 1/22* (2006.01)
*G03H 1/04* (2006.01)
*H04N 13/02* (2006.01)
*H04N 7/15* (2006.01)

(52) U.S. Cl.
CPC ........... *G03H 1/2294* (2013.01); *H04N 7/152* (2013.01); *H04N 13/0207* (2013.01); *G03H 2001/0088* (2013.01); *G03H 2001/0452* (2013.01); *G03H 2210/11* (2013.01); *G03H 2210/13* (2013.01); *G03H 2210/42* (2013.01); *G03H 2226/02* (2013.01); *G03H 2226/04* (2013.01); *G03H 2226/11* (2013.01)

(56) References Cited

U.S. PATENT DOCUMENTS

| | | |
|---|---|---|
| 8,339,693 B2 | 12/2012 | Kitamura |
| 2010/0027083 A1 | 2/2010 | Kroll et al. |
| 2010/0073744 A1 | 3/2010 | Zschau et al. |
| 2011/0279636 A1 | 11/2011 | Periyannan et al. |
| 2012/0147134 A1 | 6/2012 | Shin |
| 2012/0170089 A1* | 7/2012 | Kim ........................ G06F 3/011 359/9 |
| 2012/0314021 A1* | 12/2012 | Tsang ........................ G03H 1/02 348/40 |
| 2013/0148179 A1* | 6/2013 | Fridental .............. G03H 1/2294 359/9 |
| 2013/0162754 A1 | 6/2013 | Dye et al. |
| 2014/0071229 A1* | 3/2014 | Weerasinghe ... H04N 21/26258 348/40 |
| 2014/0160541 A1* | 6/2014 | Kim ..................... G03H 1/0011 359/2 |

OTHER PUBLICATIONS

Damien P. Kelly et al., "Digital Holographic Capture and Optoelectronic Reconstruction for 3D Displays", International Journal of Digital Multimedia Broadcasting, 2010, pp. 1-14, vol. 2010, Article ID 759323.

Vignesh. M et al., "Implementation of Holographic View in Mobile Video Calls", International Journal of Advanced Research in Computer Science and Software Engineering, Oct. 2012, pp. 471-478, vol. 2, Issue 10.

* cited by examiner

HOLOGRAPHIC IMAGE GENERATION

CROSS-REFERENCE TO RELATED APPLICATION

The present application is a U.S. national stage filing under 35 U.S.C. § 371 of International Application No. PCT/US2014/016885, filed on Feb. 18, 2014, and entitled "HOLOGRAPHIC IMAGE GENERATION." The International Application No. PCT/US2014/016885, including any appendices or attachments thereof, is hereby incorporated by reference in its entirety.

BACKGROUND

Unless otherwise indicated herein, the approaches described in this section are not prior art to the claims in this application and are not admitted to be prior art by inclusion in this section.

Holography techniques can be used to record holograms representing images of an object and reconstruct the images from the recorded holograms. A hologram can be defined as a pattern of intensities formed when an electromagnetic wave scattered by an object interferes with a coherent reference beam. In practice, lasers may be used to record holograms by capturing onto a recording medium both the scattered laser beam off the object as well as the original reference beam. The result of the differing phases and intensities of the two light fields combine at the hologram plane to create an interference pattern (or a fringe pattern), which defines the hologram.

Computer-generated holography (CGH) applies the above theory of holography to model a virtual holographic image through the use of a computer. For example, a computer calculates a holographic fringe pattern that is then used to set the optical properties of a spatial light modulator (SLM), such as a liquid crystal microdisplay. The SLM then diffracts the read-out light wave, in a manner similar to a conventional hologram, to yield the desired optical wavefront.

Compared to conventional holography, CGH has some advantages in that it does not rely on the availability of specific holographic recording materials and can generate three-dimensional images of nonexistent objects. However, similarly to the conventional holography, the holographic fringe pattern may be calculated based on properties of a laser beam that is used to replay the CGH. This makes it difficult to synthesize a three-dimensional image that can be displayed on various display units with laser light sources with different properties.

SUMMARY

Technologies generally described herein relate to generating a holographic image.

Various example apparatus configured to provide a computer-generated holography (CGH) described herein may include one or more of a server device and/or a client device. The server device may be configured to generate CGH data for an object. The client device may be configured to receive CGH data and reconstruct a holographic image of the object on a holographic image display unit using a reconstruction beam. Further, the client device may be configured to provide information on the reconstruction beam to the server device such that the server device is operable to generate the CGH data based on the information on the reconstruction beam.

In some examples, methods of providing a CGH are described. Example methods may include sending, by a client device, information on a reconstruction beam to a server device. CGH data for an object may be generated, by the server device, based on the information on the reconstruction beam. The CGH data may be received, by the client device, from the server device and a holographic image of the object may be reconstructed on a holographic image display unit using the reconstruction beam.

In some examples, computer-readable storage media may store a program for causing a processor to reconstruct a holographic image on a holographic image display unit of a client device, the holographic display unit including a reconstruction beam. The program may include one or more instructions for providing, by the client device, information on the reconstruction beam to a server device, receiving from the server device, CGH data for an object based on the information on the reconstruction beam, and reconstructing the holographic image of the object on the holographic image display unit using the CGH and the reconstruction beam.

In some examples, methods of providing CGH are described. Example methods may include sending a request, by a client device, to a server device, the request including information on a reconstruction beam. A response to the request may be received, by the client device, from the server device, the response including CGH data and beam adjustment data that is responsive to the request. The reconstruction beam may be adjusted, by the client device, based on the beam adjustment data. Further, a holographic image of the object may be reconstructed, by the client device, on a holographic image display unit with the reconstruction beam.

In some examples, client devices configured to provide a holographic image are described. Example client devices may include one or more of a holographic image display unit, a transmitter, and/or a receiver. The holographic image display unit may be configured to reconstruct the holographic image using CGH data and a reconstruction beam. The transmitter may be configured to transmit information on the holographic image display unit to a server device. The receiver may be configured to receive the CGH data from the server device. The CGH data received from the server device may be modified based on the information on the holographic image display unit.

In some examples, server devices configured to provide CGH data to a client device including a holographic image display unit are described, where the client device may be configured to display a holographic image based on the CGH data. Example server devices may include one or more of a receiver, a processor and/or a transmitter. The receiver may be configured to receive information on the holographic image display unit from the holographic image display unit. The processor may be configured to calculate the CGH data from three-dimensional image data and the information on the holographic image display unit. The transmitter may be configured to transmit the CGH data to the client device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to generating a holographic image.

Briefly stated, technologies are generally described for providing a computer-generated holography (CGH). Example devices/systems described herein may use one or more of a server device and/or a client device. In various examples, a server device is described, where the server device may be configured to provide CGH data to a client device including a holographic image display unit. The server device may include a receiver configured to receive information on the holographic image display unit from the client device, a processor configured to calculate the CGH data from three-dimensional image data and the information on the holographic image display unit, and/or a transmitter configured to transmit the CGH data to the client device. In some other examples, a client device is described, where the client device may be configured to provide a holographic image. The client device may include a holographic image display unit configured to reconstruct the holographic image using CGH data and a reconstruction beam, a transmitter configured to transmit information on the holographic image display unit to a server device, and/or a receiver configured to receive the CGH data from the server device. The CGH data received from the server device may be modified based on the information on the holographic image display unit.

Figure 1:
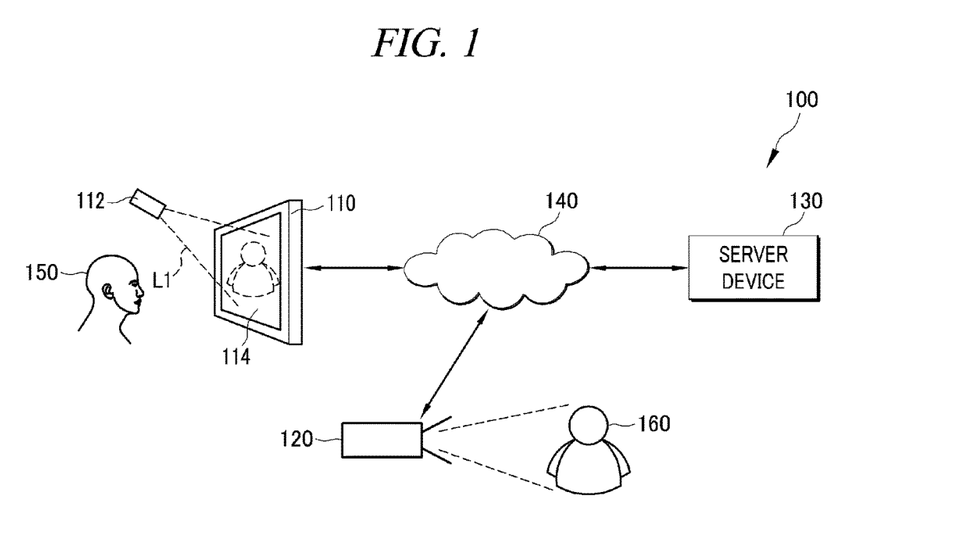
FIG. 1 schematically shows a diagram of an example system configured to provide a computer-generated holography (CGH)

FIG. 1 schematically shows a diagram of an example system configured to provide CGH, arranged in accordance with at least some embodiments described herein. As depicted, a holographic image generation system 100 may include one or more of a client device 110, and/or a server device 130. Client device 110 may be coupled to server device 130 through a communication network 140. Also, system 100 may further include an image sensor 120, which may be coupled to server device 130 through communication network 140.

In some embodiments, client device 110 may include a reconstruction beam source 112 configured to generate a reconstruction beam L1, and a holographic image display unit 114, such as a spatial light modulator (SLM), configured to display a holographic image using reconstruction beam L1. Client device 110 may be any suitable electronic device with wireless/wired network communication capabilities, including, but not limited to, a mobile device such as a cellular phone, a smartphone, a tablet computer, a laptop computer, and an electronic device such as a desktop computer, a smart TV, an adverting display screen, etc. Further, communication network 140 may include a wireless communication network such as a cellular network, a wireless LAN (local area network), a wireless WAN (wide area network), a wireless PAN (personal area network), a wired network such as LAN, WAN, PAN, Internet, and/or a combination thereof.

In operation, client device 110 may be configured to provide information on a reconstruction beam L1 generated from reconstruction beam source 112 to server device 130, such that server device 130 may be operable to generate CGH data based on the information on reconstruction beam L1. Client device 110 may be further configured to receive the CGH data from server device 130 and reconstruct a holographic image on holographic image display unit 114 using reconstruction beam L1.

In some embodiments, reconstruction beam L1 generated from reconstruction beam source 112 may include at least one of a coherent light beam such as a laser beam or a white light beam. Further, the information on reconstruction beam L1 may include at least one of reconstruction beam parameters including amplitude, phase, spectrum (e.g., spectral frequency and/or bandwidth), polarization, and an incident angle of reconstruction beam L1 with respect to holographic image display unit 114. In some embodiments, client device 110 may include an image sensor (not shown) configured to detect an incident angle of reconstruction beam L1 with respect to holographic image display unit 114, e.g., by capturing reconstruction beam L1.

In some embodiments, additionally or alternatively to providing the information on reconstruction beam L1 to server device 130, client device 110 may be configured to provide information on holographic image display unit 114 to server device 130, such that server device 130 may be operable to generate CGH data based on the information on holographic image display unit 114. The information on holographic image display unit 114 may include at least one physical characteristic or electronic characteristic of a display screen of holographic image display unit 114. For example, the information on holographic image display unit 114 may include at least one of a display size, a display resolution, an image depth and a display response time of a display screen of holographic image display unit 114.

In some embodiments, system 100 may further include image sensor 120 configured to detect three-dimensional information on an object 160 (e.g., a person who is presenting a material/document, a prototype product to be discussed in a video conference, etc.). The three-dimensional information on object 160 may include a two-dimensional image of object 160 and its depth information. For example, image sensor 120 may be a three-dimensional image sensing device or a stereoscopic image sensing device such a stereo vision camera, a multi-view camera, and any suitable three-dimensional camera configured to detect a two-dimensional image along with its depth information. The three-dimensional information on object 160 may be transmitted from image sensor 120 to server device 130, which may then generate CGH data based on the three-dimensional information using the information on reconstruction beam L1 and/or holographic image display unit 114. Server device 130 may transmit the generated CGH data to client device 110 for displaying on holographic image display unit 114.

Although FIG. 1 illustrates one client device 110, in some embodiments, system 100 may include a plurality of client devices including client device 110 and one or more additional client devices (not shown), each configured to provide information on a reconstruction beam to server device 130 such that server device 130 may be operable to generate CGH data based on the information on the reconstruction beam. Additionally or alternatively, each of the additional client devices may be configured to provide information on a holographic image display unit to server device 130 such that server device 130 may be operable to generate the CGH data based on the information on the holographic image display unit. Further, each of the additional client devices may be configured to receive the CGH data from server device 130 and reconstruct a holographic image on the holographic image display unit using the reconstruction beam. In some embodiments, at least one of the additional client devices may include an image sensor, such as a stereo vision camera, configured to detect three-dimensional information on an object.

In some embodiments, server device 130 may include a multi-point control unit (MCU) configured to perform a relay operation for two-way holographic video calls among a plurality of client devices including client device 110 and the additional client devices. In one example scenario of a video call, server device 130 may receive first video data (e.g., video stream capturing a face of a user 150) from client device 130 and also receive information on a second reconstruction beam and/or a second holographic image display unit from a second client device among the additional client devices. Server device 130 may generate first CGH data based on the first video data using the information on the second reconstruction beam and/or the second holographic image display unit, and transmit the first CGH data to the second client device. In the meantime, server device 130 may receive second video data from the second client device and also receive information on reconstruction beam L1 and/or holographic image display unit 114 from client device 110, such that server device 130 may generate second CGH data based on the second video data using the information on reconstruction beam L1 and/or holographic image display unit 114, and transmit the second CGH data to client device 110.

Figure 2:
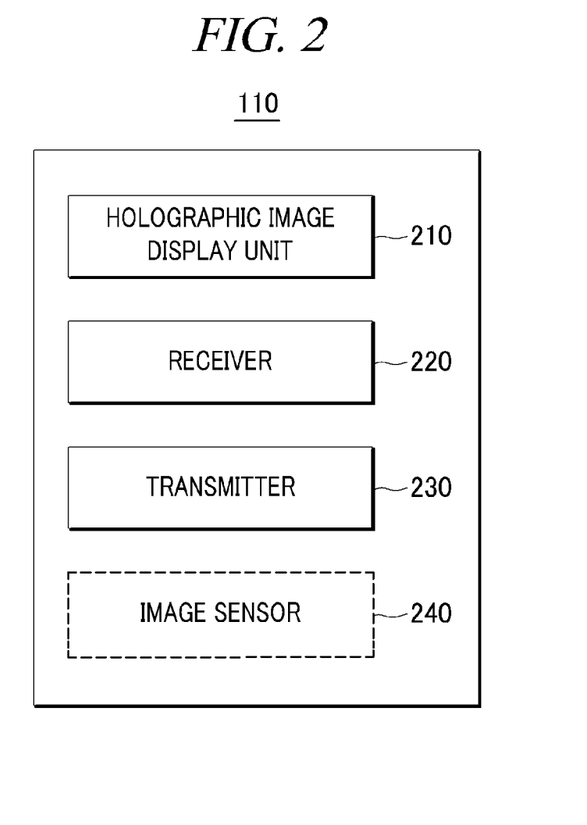
FIG. 2 schematically shows a block diagram of an example client device configured to provide a holographic image.

FIG. 2 schematically shows a block diagram of an example client device configured to provide a holographic image, arranged in accordance with at least some embodiments described herein. As illustrated, a mobile device 110 may include one or more of a holographic image display unit 210, a receiver 220, and/or a transmitter 230.

In operation, transmitter 230 of client device 110 may transmit information on holographic image display unit 210 to a server device such as server device 130, such that the server device generate CGH data using the information on holographic image display unit 210 in a similar manner as described above. Further, receiver 220 may receive the CGH data from the server device, and the CGH data received from the server device may be modified based on the information on holographic image display unit 210. Holographic image display unit 210 may reconstruct a holographic image using the CGH data and a reconstruction beam such as reconstruction beam L1 generated from reconstruction beam source 112.

In some embodiments, the information on holographic image display unit 210 may include information on the reconstruction beam. For example, the information on the reconstruction beam may include at least one of reconstruction beam parameters including amplitude, phase, spectrum, polarization, and an incident angle of the reconstruction beam with respect to holographic image display unit 210. In some embodiments, client device 110 may optionally include an image sensor 240 configured to detect an incident angle of the reconstruction beam with respect to holographic image display unit 210, e.g., by capturing the reconstruction beam.

In some embodiments, the information on holographic image display unit 210 may include at least one physical characteristic or electronic characteristic of a display screen of holographic image display unit 210. For example, the information on holographic image display unit 210 may include at least one of a display size, a display resolution, an image depth and a display response time of a display screen of holographic image display unit 210.

Figure 3:
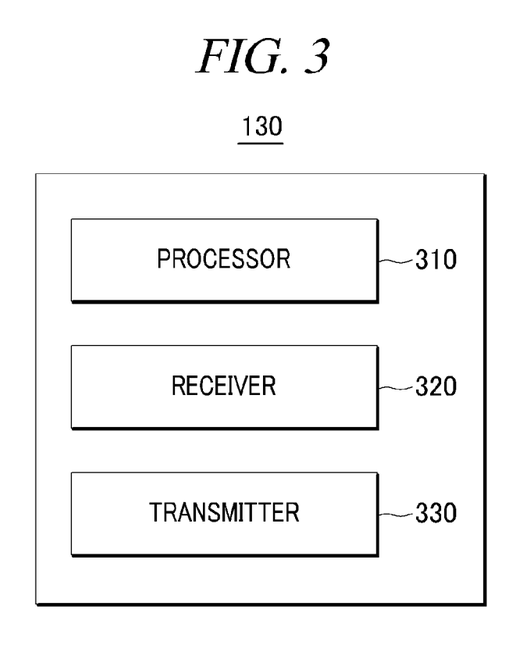
FIG. 3 schematically shows a block diagram of an example server configured to provide CGH data to a client device configured to display a holographic image based on the CGH data.

FIG. 3 schematically shows a block diagram of an example server configured to provide CGH data to a client device configured to display a holographic image based on the CGH data, arranged in accordance with at least some embodiments described herein. As depicted, a server device 130 may include one or more of a processor 310, a receiver 320, and/or a transmitter 330. Server device 130 may be configured to provide CGH data to a client device such as client device 110 including a holographic image display unit, where the client device may be configured to display a holographic image based on the CGH data in a similar manner as described above.

In operation, receiver 320 of server device 130 may receive information on the holographic image display unit such as holographic image display unit 114 or 210 from the client device. Processor 310 may calculate CGH data from three-dimensional image data, which may be received from an image sensor such as image sensor 120, and the information on the holographic image display unit. Further, transmitter 330 may transmit the CGH data to the client device for displaying on the holographic image display unit. In some embodiments, processor 310 may calculate the CGH data from the three-dimensional image data using any suitable CGH method including, but not limited to, a point source hologram method, a ray tracing method, a Fourier transform method, etc.

In some embodiments, the information on the holographic image display unit may include information on a reconstruction beam, such as reconstruction beam L1 used by the holographic image display unit 114. Further, the information on the reconstruction beam may include at least one of reconstruction beam parameters including amplitude, phase, spectrum, polarization, and an incident angle of the reconstruction beam with respect to the holographic image display unit.

Figure 4:
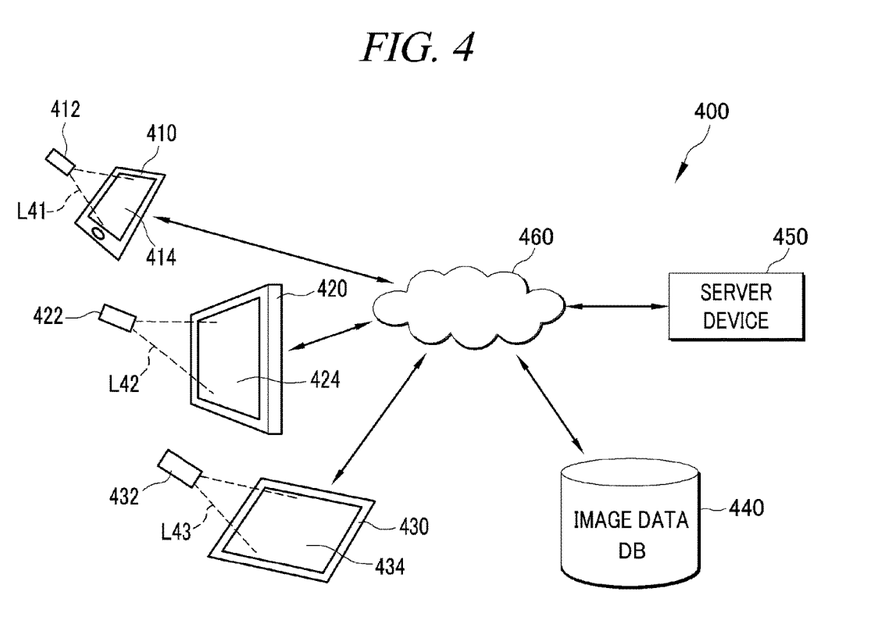
FIG. 4 schematically shows a diagram of another example system configured to provide a CGH.

FIG. 4 schematically show a diagram of another example system configured to provide a CGH, arranged in accordance with at least some embodiments described herein. As depicted, a holographic image generation system 400 may include one or more of a plurality of client devices 410, 420 and 430, and/or a server device 450. Client devices 410 to 430 may be coupled to server device 450 through a communication network 460. Also, system 400 may include an image data database (DB) 440 configured to store three-dimensional image data and provide the three-dimensional image data to server device 450 through communication network 460. In some embodiments, each of client devices 410 to 430 may include a similar configuration to client device 110 as illustrated in FIG. 2. Further, server device 450 may include a similar configuration to server device 130 as illustrated in FIG. 3.

In some embodiments, client devices 410 to 430 may be any suitable electronic devices each including a reconstruction beam source, a holographic image display unit such as a spatial light modulator (SLM) and wireless/wired network communication capabilities. As illustrated in FIG. 4, client device 410 may be a smartphone including a reconstruction beam source 412 and a holographic image display unit 414. Client device 420 may be a video conference system including a reconstruction beam source 422 and a holographic image display unit 424. Also, client device 430 may be a tablet computer including a reconstruction beam source 432 and a holographic image display unit 434. Communication network 460 may include a wireless communication network such as a cellular network, a wireless LAN, a wireless WAN, a wireless PAN, a wired network such as LAN, WAN, PAN, Internet, and/or a combination thereof.

In operation, client devices 410 to 430 may provide server device 450 with information on reconstruction beams L41 to L43 generated from reconstruction beam sources 412 to 432 and/or holographic image display units 414 to 434, respectively. Further, image data DB 440 may provide pre-stored three-dimensional image data (e.g., three-dimensional video stream data) to server device 450 through communication network 460. Server device 450 may then generate three sets of CGH data based on the three-dimensional image data using the information on reconstruction beams L41 to L43, respectively. Additionally or alternatively, server device 450 may generate three sets of CGH data based on the three-dimensional image data using information on holographic image display units 414 to 434, respectively. Server device 450 may transmit the three sets of CGH data to client devices 410 to 430 for displaying on holographic image display units 414 to 434, respectively.

Figure 5:
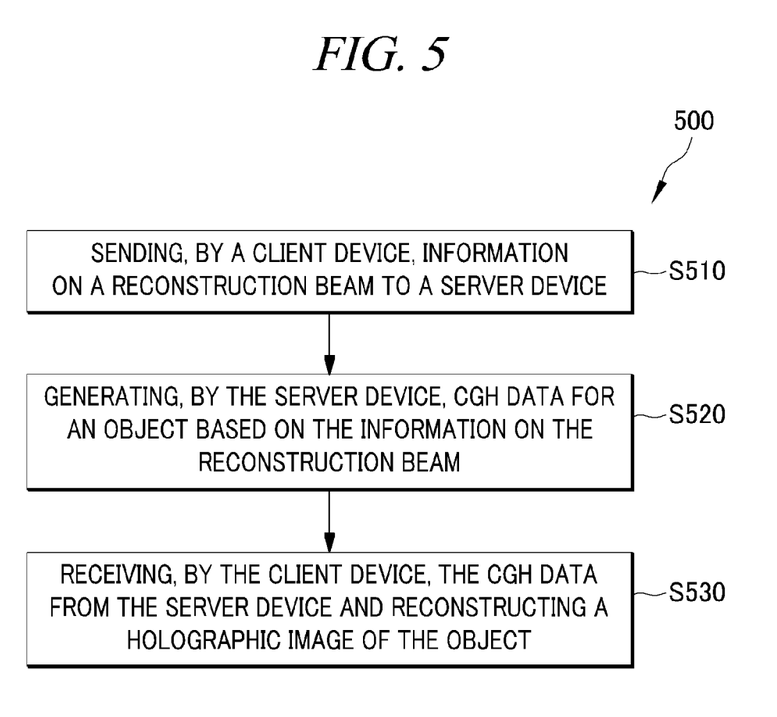
FIG. 5 illustrates a flow diagram of an example method adapted to provide a CGH.

FIG. 5 illustrates a flow diagram of an example method adapted to provide a CGH, arranged in accordance with at least some embodiments described herein. An example method 500 in FIG. 5 may be implemented using, for example, a computing device including a processor adapted to provide a CGH.

Method 500 may include one or more operations, actions, or functions as illustrated by one or more of blocks S510, S520, and/or S530. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 500 may begin at block S510, "SENDING, BY A CLIENT DEVICE, INFORMATION ON A RECONSTRUCTION BEAM TO A SERVER DEVICE."

At block S510, information on a reconstruction beam may be sent, by a client device, to a server device. As depicted in FIGS. 1 to 3, client device 110 may provide information on reconstruction beam L1 generated from reconstruction beam source 112 to server device 130, such that server device 130 may be operable to generate CGH data based on the information on reconstruction beam L1.

In some embodiments, the reconstruction beam may include at least one of a coherent light beam such as a laser beam or a white light beam. Further, the information on the reconstruction beam may include at least one of reconstruction beam parameters including amplitude, phase, spectrum (e.g., spectral frequency and/or bandwidth), polarization, and an incident angle of the reconstruction beam with respect to a holographic image display unit of the client device, such as holographic image display unit 114. Additionally or alternatively to providing the information on the reconstruction beam to the server device, the client device may provide information on the holographic image display unit to the server device. The information on the holographic image display unit may include at least one physical characteristic or electronic characteristic of a display screen of the holographic image display unit. For example, the information on the holographic image display unit may include at least one of a display size, a display resolution, an image depth and a display response time of a display screen of the holographic image display unit. In some embodiments, an incident angle of the reconstruction beam with respect to the holographic image display unit may be detected, by an image sensor, e.g., by capturing the reconstruction beam. Block S510 may be followed by block S520, "GENERATING, BY THE SERVER DEVICE, CGH DATA FOR AN OBJECT BASED ON THE INFORMATION ON THE RECONSTRUCTION BEAM."

At block S520, CGH data for an object may be generated, by the server device, based on the information on the reconstruction beam. As illustrated in FIGS. 1 to 3, server device 130 may generate CGH data based on the information on reconstruction beam L1. In some embodiments, an image of the object may be captured by an image sensor, such as image sensor 120 configured to detect three-dimensional information on an object, and may be provide to the server device. The detected three-dimensional information may include a two-dimensional image of the object and its depth information. The three-dimensional information on the object may be transmitted from the image sensor to the server device. Block S520 may be followed by block S530, "RECEIVING, BY THE CLIENT DEVICE, THE CGH DATA FROM THE SERVER DEVICE AND RECONSTRUCTING A HOLOGRAPHIC IMAGE OF THE OBJECT."

At block S530, the CGH data may be received, by the client device, from the server and a holographic image of the object may be reconstructed. As illustrated in FIGS. 1 to 3, client device 110 may receive the CGH data from server device 130 and reconstruct a holographic image on holographic image display unit 114 using the reconstruction beam.

Figure 6:
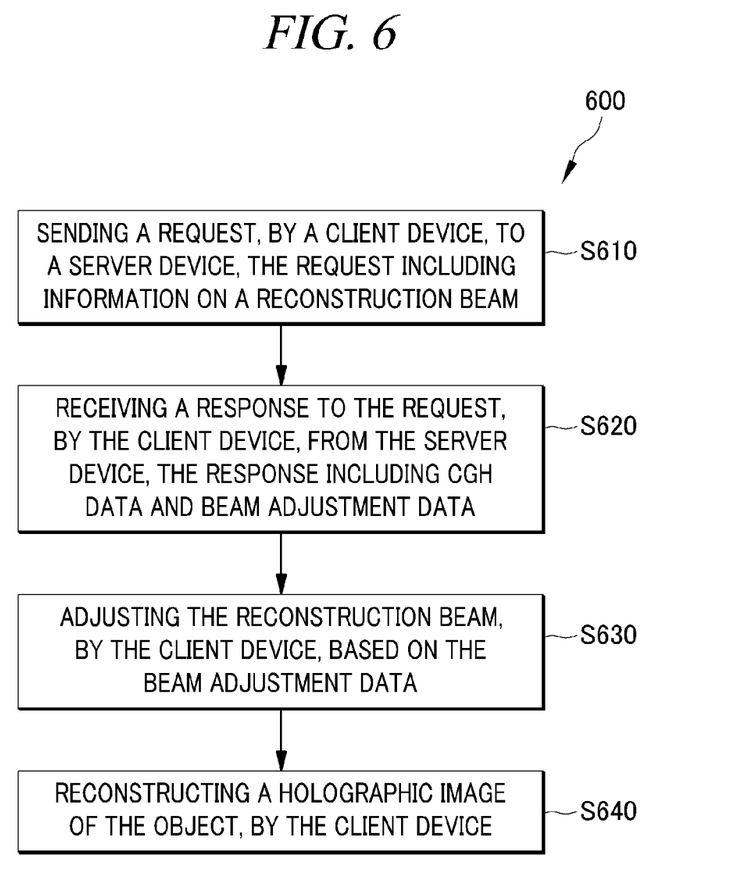
FIG. 6 illustrates a flow diagram of another example method adapted to provide a CGH.

FIG. 6 illustrates a flow diagram of another example method adapted to provide a CGH, arranged in accordance with at least some embodiments described herein. An example method 600 in FIG. 6 may be implemented using, for example, a computing device including a processor adapted to provide a CGH.

Method 600 may include one or more operations, actions, or functions as illustrated by one or more of blocks S610, S620, S630 and/or S640. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 600 may begin at block S610, "SENDING A REQUEST, BY A CLIENT DEVICE, TO A SERVER DEVICE, THE REQUEST INCLUDING INFORMATION ON A RECONSTRUCTION BEAM."

At block S610, a request may be sent to a server device, by a client device, the request including information on a reconstruction beam. As depicted in FIGS. 1 to 3, client device 110 may provide information on reconstruction beam L1 generated from reconstruction beam source 112 to server device 130, such that server device 130 may be operable to generate CGH data based on the information on reconstruction beam L1. Block S610 may be followed by block S620, "RECEIVING A RESPONSE TO THE REQUEST, BY THE CLIENT DEVICE, FROM THE SERVER DEVICE, THE RESPONSE INCLUDING CGH DATA AND BEAM ADJUSTMENT DATA."

At block S620, a response to the request may be received, by the client device, from the server device, the response including CGH data and beam adjustment data. As illustrated in FIGS. 1 to 3, client device 110 may receive the CGH data and/or beam adjustment data from server device 130. In some embodiments, the beam adjustment data may include information on how to control at least one of reconstruction beam parameters including amplitude, phase, spectrum, polarization, and an incident angle of the reconstruction beam with respect to a holographic image display unit of the client device, such as holographic image display unit 114. Block S620 may be followed by block S630, "ADJUSTING THE RECONSTRUCTION BEAM, BY THE CLIENT DEVICE, BASED ON THE BEAM ADJUSTMENT DATA."

At block S630, the reconstruction beam may be adjusted, by the client device, based on the beam adjustment data. In some embodiments, the client device may adjust the reconstruction beam by controlling at least one of reconstruction beam parameters included in the beam adjustment data, including amplitude, phase, spectrum, polarization, and an incident angle of the reconstruction beam with respect to the holographic image display unit of the client device. Block S630 may be followed by block S640, "RECONSTRUCTING A HOLOGRAPHIC IMAGE OF THE OBJECT, BY THE CLIENT DEVICE."

At block S640, a holographic image of the object may be reconstructed by the client device. As illustrated in FIGS. 1 to 3, client device 110 may receive the CGH data from server device 130 and reconstruct a holographic image on holographic image display unit 114 using reconstruction beam L1.

In light of the present disclosure, one skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
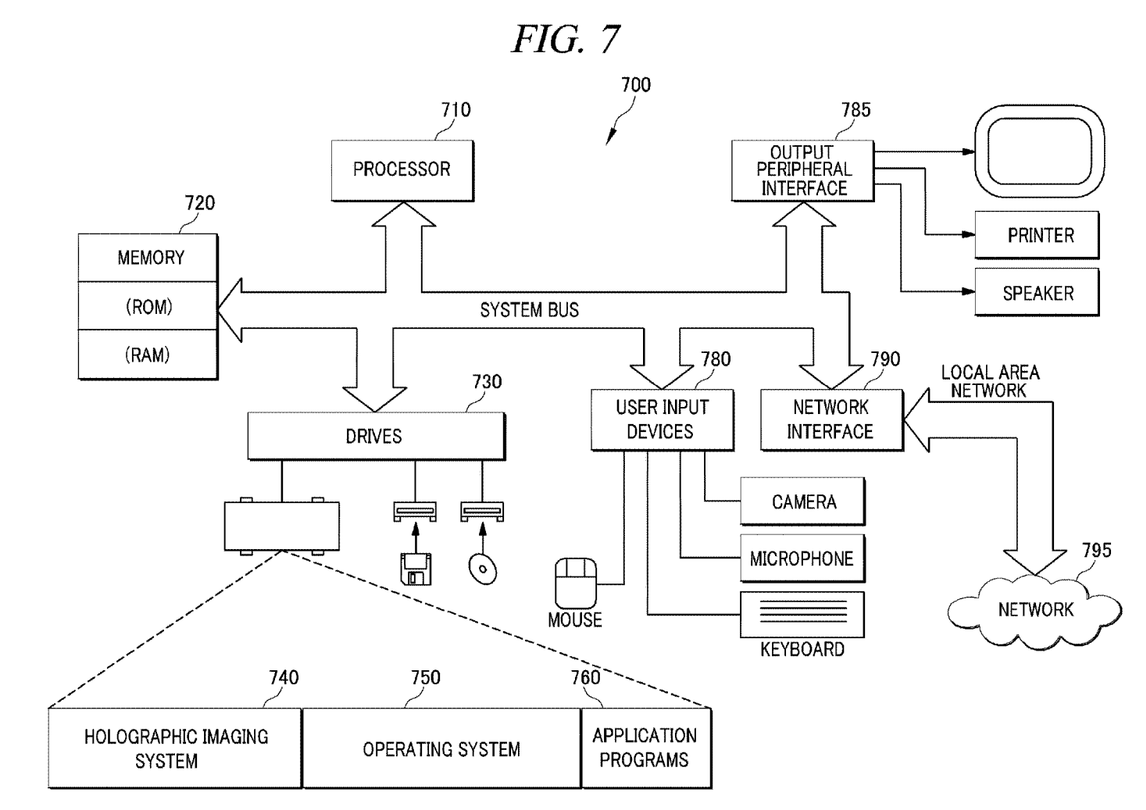
FIG. 7 shows a schematic block diagram illustrating an example computing system that can be configured to provide a CGH.

FIG. 7 shows a schematic block diagram illustrating an example computing system that can be configured to provide a CGH, arranged in accordance with at least some embodiments described herein. As depicted in FIG. 7, a computer 700 may include a processor 710, a memory 720 and one or more drives 730. Computer 700 may be implemented as a conventional computer system, an embedded control computer, a laptop, or a server computer, a mobile device, a set-top box, a kiosk, a vehicular information system, a mobile telephone, a customized machine, or other hardware platform.

Drives 730 and their associated computer storage media may provide storage of computer readable instructions, data structures, program modules and other data for computer 700. Drives 730 may include a holographic image generation system 740, an operating system (OS) 750, and application programs 760. Holographic image generation system 740 may be adapted to provide a CGH in such a manner as described above with respect to FIGS. 1 to 6.

Computer 700 may further include user input devices 780 through which a user may enter commands and data. Input devices can include an electronic digitizer, a camera, a microphone, a keyboard and pointing device, commonly referred to as a mouse, trackball or touch pad. Other input devices may include a joystick, game pad, satellite dish, scanner, or the like.

These and other input devices can be coupled to processor 710 through a user input interface that is coupled to a system bus, but may be coupled by other interface and bus structures, such as a parallel port, game port or a universal serial bus (USB). Computers such as computer 700 may also include other peripheral output devices such as display devices, which may be coupled through an output peripheral interface 785 or the like.

Computer 700 may operate in a networked environment using logical connections to one or more computers, such as a remote computer coupled to a network interface 790. The remote computer may be a personal computer, a server, a router, a network PC, a peer device or other common network node, and can include many or all of the elements described above relative to computer 700.

Networking environments are commonplace in offices, enterprise-wide area networks (WAN), local area networks (LAN), intranets, and the Internet. When used in a LAN or WLAN networking environment, computer 700 may be coupled to the LAN through network interface 790 or an adapter. When used in a WAN networking environment, computer 700 typically includes a modem or other means for establishing communications over the WAN, such as the Internet or a network 795. The WAN may include the Internet, the illustrated network 795, various other networks, or any combination thereof. It will be appreciated that other mechanisms of establishing a communications link, ring, mesh, bus, cloud, or network between the computers may be used.

In some embodiments, computer 700 may be coupled to a networking environment. Computer 700 may include one or more instances of a physical computer-readable storage medium or media associated with drives 730 or other storage devices. The system bus may enable processor 710 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 720, whether characterized as RAM, ROM, flash, or other types of volatile or nonvolatile memory technology.

The media may also represent secondary storage, whether implemented as storage drives 730 or otherwise. Hard drive implementations may be characterized as solid state, or may include rotating media storing magnetically encoded information.

Processor 710 may be constructed from any number of transistors or other circuit elements, which may individually or collectively assume any number of states. More specifically, processor 710 may operate as a state machine or finite-state machine. Such a machine may be transformed to a second machine, or specific machine by loading executable instructions. These computer-executable instructions may transform processor 710 by specifying how processor 710 transitions between states, thereby transforming the transistors or other circuit elements constituting processor 710 from a first machine to a second machine. The states of either machine may also be transformed by receiving input from user input devices 780, network interface 790, other peripherals, other interfaces, or one or more users or other actors. Either machine may also transform states, or various physical characteristics of various output devices such as printers, speakers, video displays, or otherwise.

Figure 8:
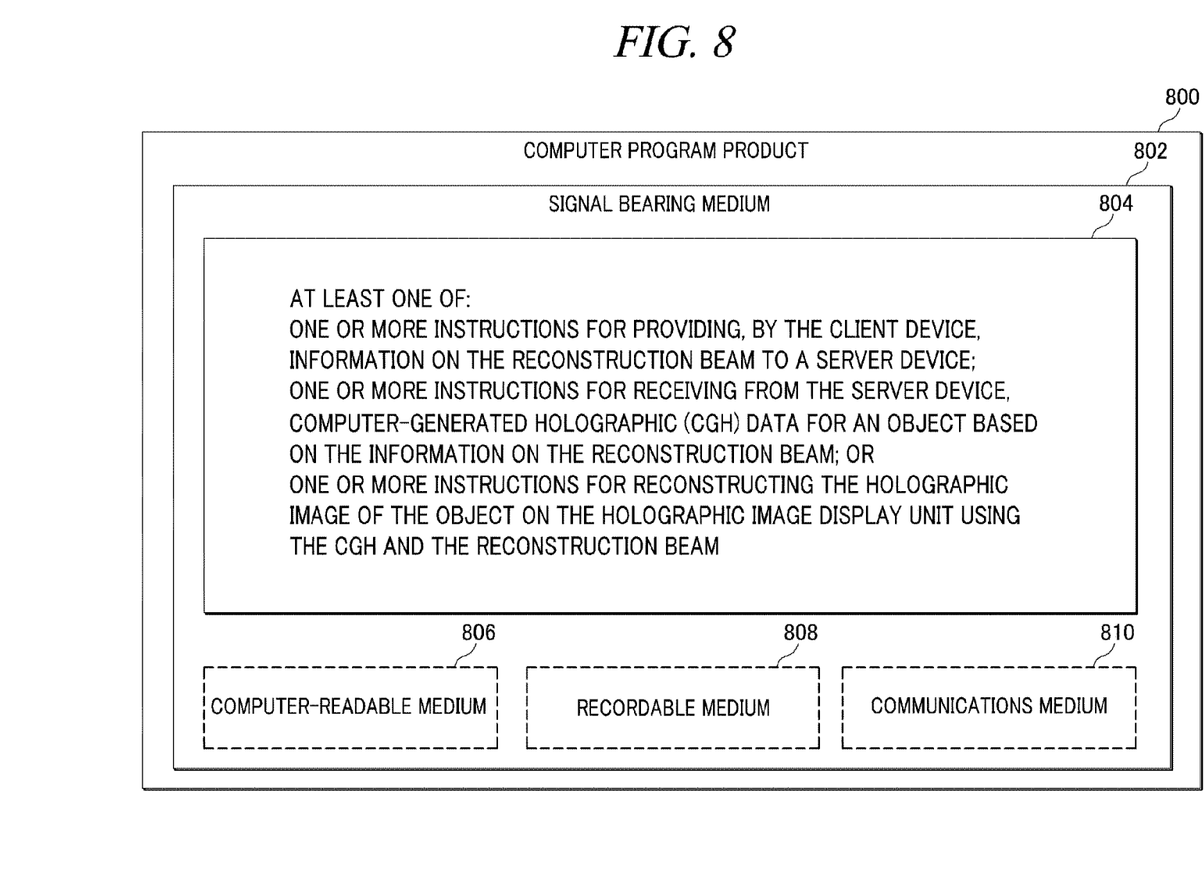
FIG. 8 illustrates computer program products that can be utilized to reconstruct a holographic image on a holographic image display unit of a client device, all arranged in accordance with at least some embodiments described herein.

FIG. 8 illustrates computer program products that can be utilized to reconstruct a holographic image on a holographic image display unit of a client device, in accordance with at least some embodiments described herein. Program product 800 may include a signal bearing medium 802. Signal bearing medium 802 may include one or more instructions 804 that, when executed by, for example, a processor, may provide the functionality described above with respect to FIGS. 1 to 6. By way of example, instructions 804 may include at least one of: one or more instructions for providing, by the client device, information on the reconstruction beam to a server device; one or more instructions for receiving from the server device, computer-generated holographic data for an object based on the information on the reconstruction beam; or one or more instructions for reconstructing the holographic image of the object on the holographic image display unit using the computer-generated holographic data and the reconstruction beam. Thus, for example, referring to FIGS. 1 to 4, client device 110, 410, 420 or 430 or system 100 or 400 may undertake one or more of the blocks shown in FIG. 5 or 6 in response to instructions 804.

In some implementations, signal bearing medium 802 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of client device 110, 410, 420 or 430 or system 100 or 400 by an RF signal bearing medium 802, where the signal bearing medium 802 is conveyed by a wireless communications medium 810 (e.g., a wireless communications medium conforming with the IEEE 802.11 standard).

In some embodiments, CGH data are calculated based on information relating to a reconstruction beam that is used in the holographic image display. CGH data may be modified based on the information on the reconstruction beam, allowing a holographic image to be displayed with improved quality. Holographic image quality may be improved on one or more of various displays using different light sources as the reconstruction beam. The information on the reconstruction beam may include one or more of: spectral data (such as center wavelength, bandwidth (degree of monochromacity), spectral characteristics, and the like), beam intensity (such as total beam intensity, beam intensity within one or more spectral ranges, and the like), coherence data (such as coherence length), polarization, phase data (such as the phase of a coherent reconstruction beam relative to other time-dependent parameters), modulation (if any), physical configuration data (such as the distance of a beam source from display, physical extent of the reconstruction beam at the display, physical extent of the reconstruction beam source, incident angle of a reconstruction beam on the display), display size, and the like. The information may include an identification of the type of reconstruction beam source, for example by identifying the reconstruction beam source as one or more of: a white light source, laser, LED, fluorescent lamp, halogen lamp, diffuse solar radiation, or direct solar radiation from the Sun). In some examples, a display user may select a reconstruction beam source type from a menu displayed on a client device, or otherwise input the type of reconstruction beam source into the client device.

Using conventional approaches, a holographic image may include distortions due to variations in the properties of the reconstruction beam. In case of using a laser beam as the reconstruction beam, any variation in either divergence, angle of incidence, or wavelength of the beam may produce some distortion in the reconstructed holographic image. Thus, changes in the above properties of the laser beam may result in changes in the relative size, shape, orientation and location of objects in the reconstructed image. In some embodiments, CGH data is generated taking account of such information, improving the fidelity of a holographic image. For example, in ray tracing based hologram implementation, as a virtual reference beam is altered, the path length difference between the reference beam and an object beam is changed. Thus changed path length difference can eventually influence the relative phase of the object beam being scattered by the object, which is to be computed and coded as CGH data. A holographic image may be one of a plurality of holographic images forming a holographic video.

In some embodiments, information on the reconstruction beam is determined by a client device, for example by detection and analysis of the reconstruction beam. In some embodiments, reconstruction beam information may be encoded in the reconstruction beam itself, or transmitted by the reconstruction beam source to a client device. If the reconstruction beam changes (for example, by relocation to a different environment), revised information on the reconstruction beam may be transmitted to the server device. In some examples, a user of the client device may enter information. In some embodiments, a user of the client device may adjust the holographic image to improve appearance, and information on the reconstruction beam determined from the adjustments.

In some embodiments, information on the reconstruction beam may be determined at intervals, in some cases effectively continuously, and used to improve the displayed images as a client device is relocated between different locations each having a different reconstruction beam. Image quality can be enhanced and/or maintained over a plurality of viewing environments (or locations). CGH data may be adaptively modified as the reconstruction beam changes.

In some embodiments, the reconstruction beam may be generated by a reconstruction beam source associated with the client device. Spectral information for the source may be known. However, information such as relative location and orientation of the reconstruction beam may be determined at intervals to improve the holographic image.

In some embodiments, the client device itself may modify the CGH data based on the information relating to the reconstruction beam, improving the holographic images displayed.

In some embodiments, the client device may include a camera, and the camera may be used to determine information relating to the reconstruction beam, such as physical location of the reconstruction beam source, spectral information, or other information.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system configured to provide a computer-generated holography (CGH), the system comprising:
    a server device configured to generate CGH data for an object;
    a client device configured to receive the CGH data and reconstruct a holographic image of the object on a holographic image display unit using a reconstruction beam, wherein the client device is further configured to provide information on the reconstruction beam to the server device such that the server device is operable to generate the CGH data based on the information on the reconstruction beam.

2. The system of claim 1, wherein the server device includes a multi-point control unit (MCU) configured to perform a relay operation for two-way holographic video calls.

3. The system of claim 1, wherein the holographic image display unit includes a spatial light modulator (SLM) configured to receive the reconstruction beam and reconstruct the holographic image of the object using the reconstruction beam.

4. The system of claim 1, further comprising an image sensor configured to capture an image of the object.

5. The system of claim 4, wherein the image sensor is a stereo vision camera.

6. The system of claim 1, wherein the reconstruction beam includes at least one of a laser beam or a white light.

7. The system of claim 1, wherein the information on the reconstruction beam includes at least one reconstruction beam parameter selected from a group of parameters consisting of amplitude, phase, spectrum, polarization, and an incident angle of the reconstruction beam with respect to the holographic image display unit.

8. The system of claim 1, wherein the information on the reconstruction beam includes spectrum of the reconstruction beam.

9. The system of claim 8, wherein the spectrum of the reconstruction beam includes at least one of a spectral frequency and a bandwidth of the reconstruction beam.

10. The system of claim 1, wherein the information on the reconstruction beam includes amplitude of the reconstruction beam.

11. The system of claim 1, wherein the client device is further configured to provide information on the holographic image display unit to the server device such that the server device is operable to generate the CGH data based on the information on the holographic image display unit.

12. The system of claim 11, wherein the information on the holographic image display unit includes at least one physical characteristic of a display screen of the holographic image display unit.

13. The system of claim 11, wherein the information on the holographic image display unit includes at least one of a display size, a display resolution, an image depth, and a display response time of a display screen of the holographic image display unit.

14. The system of claim 1, wherein the client device includes an image sensor configured to detect an incident angle of the reconstruction beam with respect to the holographic image display unit.

15. The system of claim 1, wherein the information on the reconstruction beam includes an incident angle of the reconstruction beam.

16. The system of claim 1, further comprising a plurality of client devices that includes the client device and one or more second client devices, wherein each of the one or more second client devices is configured to receive second CGH data and reconstruct a second holographic image of the object on a second holographic image display unit using a second reconstruction beam, and wherein each of the one or more second client devices is further configured to provide information on the second reconstruction beam to the server device such that the server device is operable to generate the second CGH data based on the information on the second reconstruction beam.

17. The system of claim 16, wherein at least one of the one or more second client devices comprises an image sensor configured to capture an image of the object.

18. The system of claim 17, wherein the image sensor is a stereo vision camera.

19. A method of to provide a computer-generated holography (CGH), the method comprising:
    sending, by a client device, information on a reconstruction beam to a server device;
    generating, by the server device, CGH data for an object based on the information on the reconstruction beam; and
    receiving, by the client device, the CGH data from the server device and reconstructing a holographic image of the object on a holographic image display unit using the reconstruction beam.

20. The method of claim 19, further comprising:
    capturing, by an image sensor, an image of the object; and
    providing the captured image of the object to the server device.

21. The method of claim 20, wherein capturing, by the image sensor, the image of the object comprises capturing, by the image sensor, a stereoscopic image of the object.

22. The method of claim 19, wherein providing, by the client device, the information on the reconstruction beam to the server device comprises providing the server device with at least one reconstruction beam parameter selected from a group of parameters consisting of amplitude, phase, spectrum, polarization, and an incident angle of the reconstruction beam with respect to the holographic image display unit.

23. The method of claim 22, wherein providing, by the client device, the information on the reconstruction beam to the server device comprises providing the server device with the spectrum of the reconstruction beam.

24. The method of claim 22, wherein providing, by the client device, the information on the reconstruction beam to the server device comprises providing the server device with the amplitude of the reconstruction beam.

25. The method of claim 19, further comprising providing, by the client device, information on the holographic image display unit to the server device such that the server device is operable to generate the CGH data based on the information on the holographic image display unit.

26. The method of claim 25, wherein providing, by the client device, the information on the holographic image display unit comprises providing, by the client device, at least one physical characteristic of a display screen of the holographic image display unit.

27. The method of claim 25, wherein providing, by the client device, the information on the holographic image display unit comprises providing, by the client device, information on at least one of a display size, a display resolution, an image depth, and a display response time of a display screen of the holographic image display unit.

28. The method of claim 19, further comprising detecting, by an image sensor, an incident angle of the reconstruction beam with respect to the holographic image display unit.

29. The method of claim 19, further comprising:
sending, by one or more second client devices, information on one or more second reconstruction beams to the server device;
generating, by the sever device, second CGH data for one or more second objects based on the information on the one or more second reconstruction beams; and
receiving, by the one or more second client devices, the second CGH data from the server device and reconstructing one or more second holographic images of the one or more second objects on one or more second holographic image display units using the one or more second reconstruction beams.

30. A method of to provide computer-generated holography (CGH), the method comprising:
sending a request, by a client device, to a server device, wherein the request includes information on a reconstruction beam;
receiving a response to the request, by the client device, from the server device, wherein the response includes CGH data and beam adjustment data that is responsive to the request;
adjusting the reconstruction beam, by the client device, based on the beam adjustment data; and
reconstructing a holographic image of the object, by the client device, on a holographic image display unit with the reconstruction beam.

31. A client device configured to provide a holographic image, the client device comprising:
a holographic image display unit, configured to reconstruct the holographic image using computer-generated holography (CGH) data and a reconstruction beam;
a transmitter, configured to transmit information on the holographic image display unit to a server device; and
a receiver, configured to receive the CGH data from the server device, wherein the CGH data received from the server device is modified based on the information on the holographic image display unit.

32. The client device of claim 31, wherein the information on the holographic image display unit includes information on the reconstruction beam used by the holographic image display unit.

33. The client device of claim 32, wherein the information on the reconstruction beam includes at least one reconstruction beam parameter selected from a group of parameters consisting of amplitude, phase, spectrum, polarization, and an incident angle of the reconstruction beam with respect to the holographic image display unit.

34. The client device of claim 32, wherein the information on the reconstruction beam includes spectrum of the reconstruction beam.

35. The client device of claim 32, wherein the information on the reconstruction beam includes amplitude of the reconstruction beam.

36. The client device of claim 31, wherein the information on the holographic image display unit includes at least one physical characteristic of a display screen of the holographic image display unit.

37. The client device of claim 31, wherein the information on the holographic image display unit includes at least one of a display size, a display resolution, an image depth, and a display response time of a display screen of the holographic image display unit.

38. A server device, configured to provide computer-generated holography (CGH) data to a client device including a holographic image display unit, wherein the client device is configured to reconstruct a holographic image using a reconstruction beam and to display the holographic image based on the CGH data, the server device including:
a receiver, configured to receive information on the holographic image display unit from the client device on the reconstruction beam;
a processor, configured to calculate the CGH data from three-dimensional image data and the information on the holographic image display unit; and
a transmitter, configured to transmit the CGH data to the client device.

39. The server device of claim 38, wherein the information on the holographic image display unit includes information on the reconstruction beam used by the holographic image display unit.

40. The server device of claim 39, wherein the information on the reconstruction beam includes at least one reconstruction beam parameter selected from a group of reconstruction beam parameters consisting of amplitude, phase, spectrum, polarization, and an incident angle of the reconstruction beam with respect to the holographic image display unit.

* * * * *

UNITED STATES PATENT AND TRADEMARK OFFICE
CERTIFICATE OF CORRECTION

| | | |
|---|---|---|
| PATENT NO. | : 9,915,920 B2 | Page 1 of 1 |
| APPLICATION NO. | : 15/117730 | |
| DATED | : March 13, 2018 | |
| INVENTOR(S) | : Oh | |

It is certified that error appears in the above-identified patent and that said Letters Patent is hereby corrected as shown below:

In the Specification

In Column 7, Line 5, delete "show a" and insert -- shows a --, therefor.

In Column 11, Lines 26-27, delete "Program product 800" and insert -- Computer program product 800 --, therefor.

In Column 11, Line 47, delete "a hard disk drive," and insert -- a Hard Disk Drive (HDD), --, therefor.

In Column 11, Lines 55-56, delete "a wired communications link," and insert -- a wired communication link, --, therefor.

In Column 11, Line 57, delete "program product 800" and insert -- computer program product 800 --, therefor.

In Column 14, Line 6, delete "recitation" and insert -- recitation, --, therefor.

In Column 14, Line 29, delete "general" and insert -- general, --, therefor.

In Column 14, Line 36, delete "general" and insert -- general, --, therefor.

Signed and Sealed this
Twenty-ninth Day of May, 2018

Andrei Iancu
*Director of the United States Patent and Trademark Office*